May 14, 1929.  G. R. METCALF, JR  1,712,895
CONDUIT CONSTRUCTION
Filed Dec. 22, 1926

George R. Metcalf Jr.
INVENTOR

BY
ATTORNEYS.

Patented May 14, 1929.

1,712,895

UNITED STATES PATENT OFFICE.

GEORGE RALPH METCALF, JR., OF ERIE, PENNSYLVANIA, ASSIGNOR TO ERIE MALLEABLE IRON COMPANY, OF ERIE, PENNSYLVANIA, A CORPORATION OF PENNSYLVANIA.

CONDUIT CONSTRUCTION.

Application filed December 22, 1926. Serial No. 156,496.

In the leading of conduits through concrete floors it is quite common to use a conduit formed of fiber, or paper, stock, the real mission of the conduit being merely to act as a form as the plastic material is laid. The present invention is designed to facilitate the connecting up of conduits of this type with the ordinary metallic conduit which is carried to the point of use. Features and details of the invention will appear from the specification and claim.

The invention is illustrated in the accompanying drawings as follows:—

Figure 1:
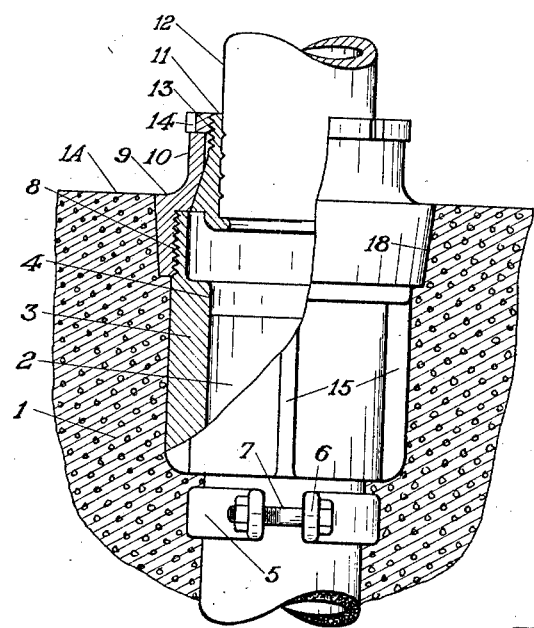

Fig. 1 shows a sectional view of the conduit connection as arranged in a floor.

Figure 2:
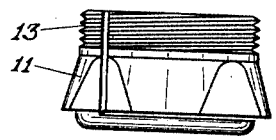

Fig. 2 an elevation of the contracting sleeve of the fitting.

Figure 3:
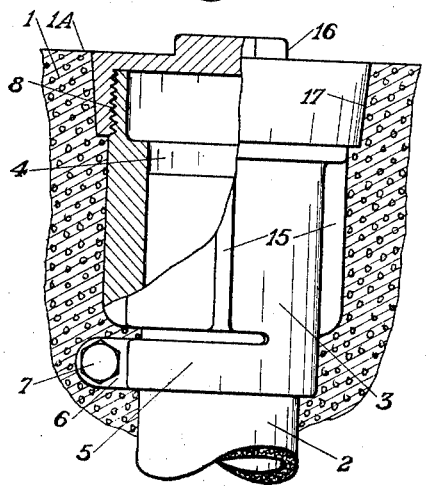

Fig. 3 a view of the fitting capped.

Figure 4:
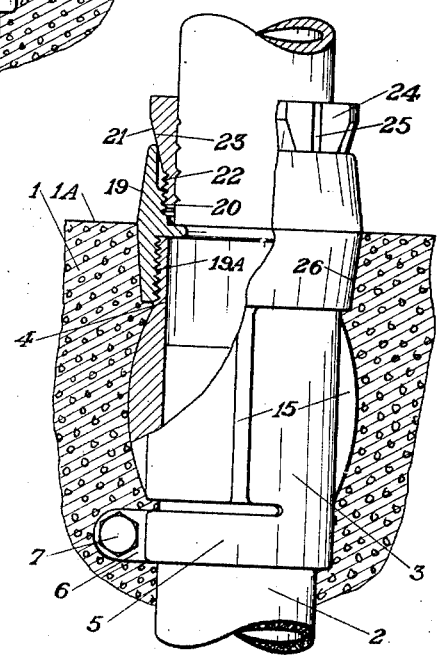

Fig. 4 a sectional view showing an alternative construction.

1 marks the plastic floor which has the floor level 1ª. The conduit 2 is put in place prior to the laying of this floor and a floor section of fitting 3 is secured to the conduit 2, the fitting having a socket 4 into which the conduit extends. The fitting has the clamp fingers 5 extending from its lower end terminating in ears 6 through which a clamping screw 7 extends. This clamp is of peculiar advantage in this construction because the fiber, or paper conduit 2 varies quite widely in diameter and the finger clamp has a wide clamping range.

The upper end of the floor section of the fitting is screw-threaded at 8, the upper end of this fitting terminating preferably just below the floor level. A supplemental section 9 is screwed on to the floor section and has a sleeved extension 10. A tapered contracting sleeve 11 is arranged in the extension and is adapted to receive a threadless conduit 12. The upper end of the sleeve is screw-threaded at 13 and a nut 14 operates on this upper end and thus draws the sleeve into the extension 10 contracting it and clamping it on the conduit 12 which ordinarily will be of the usual metallic type. The floor section of the fitting is ordinarily secured to the conduit prior to the laying of the floor being brought to the proper floor level and it is desirable to close the conduit so as to prevent material entering the conduit during the laying of the floor. To this end a cap 16 may be screwed on the floor section of the fitting, the upper face of this cap being at the floor level. The periphery of this cap is slightly tapered at 17 so that it may be readily removed and the supplemental section has its periphery at 18 slightly smaller than the periphery 17 so that when the cap is removed the supplemental section of the fitting will readily enter the socket in the concrete left by the cap. It is obvious that if desired the cap may be left temporarily in place at the floor level until the floor conduit may be desired so that the cap serves the double function, acting as a part of the form in finishing the conduit at the floor level and in forming a cap if desired.

In order that the screwing to place of the cap or the upper section may not disturb the floor section it is desirable to form the floor section with ribs 15 which seating in the concrete lock the floor section against turning. It will be noted that with this construction the floor section being solidly set in the concrete forms a support which will retain the upwardly extending conduit 12 rigidly so that other support is not required. Heretofore it has been common to build up around the upstanding conduit a base of concrete for this purpose. This invention obviates the necessity of such construction.

In Fig. 4 the floor section is similar to that shown in Figs. 1 and 3. The supplemental section 19, however, has a screw thread 19ª engaging the threads on the floor section and is internally screw-threaded at 20. A sleeve 21 having a screw-threaded end 22, a tapered intermediate portion 23, and a wrench-hold portion 24, is screwed into the section. It is provided with a slot 25 so that as it is screwed in, the tapered portion contracts this sleeve clamping it to the conduit. The floor section may be capped in this construction as in the preceding structure, the section 19 having a tapered outer surface 26 corresponding to the surface 18. It will be noted that the supplemental sections illustrated in Figs. 1 and 4 involve the manner of securing threadless conduit exemplified in the patents to Howard A. Selah, #1,597,486 and #1,606,188 respectively.

What I claim as new is:—

In a conduit construction, the combination of a floor formed of plastic material; a conduit in the body of the material; and a fitting comprising a floor section secured to the conduit below the floor level, a supplemental section secured to the floor section and having a tapered periphery with the larger end toward the floor surface, and a conduit secured to the supplemental section.

In testimony whereof I have hereunto set my hand.

GEORGE RALPH METCALF, Jr.